UNITED STATES PATENT OFFICE.

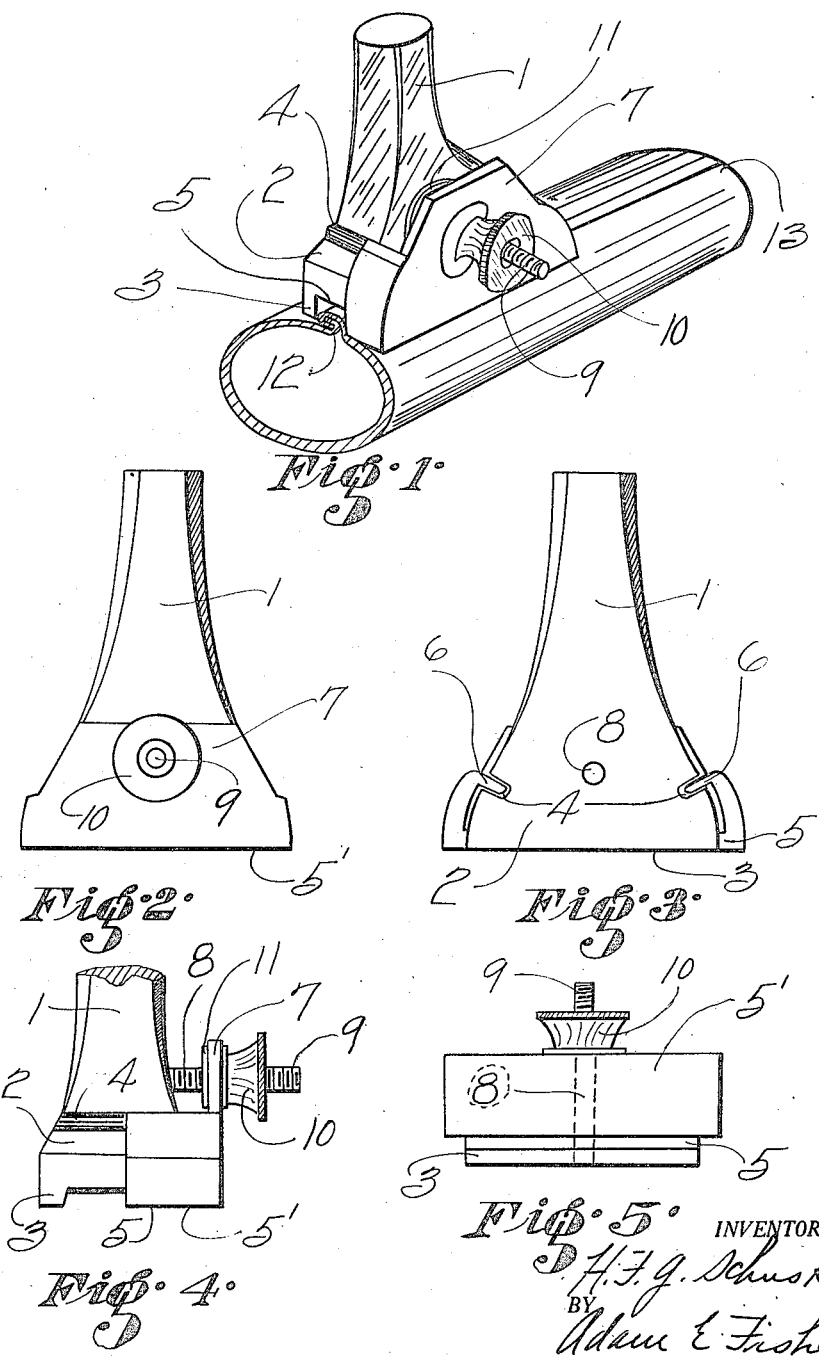

HENRY F. G. SCHUSKE, OF ST. JOSEPH, MISSOURI.

SEAM-SETTING TOOL.

1,423,581. Specification of Letters Patent. Patented July 25, 1922.

Application filed December 9, 1920. Serial No. 429,325.

*To all whom it may concern:*

Be it known that I, HENRY F. G. SCHUSKE, a citizen of the United States, residing in the city of St. Joseph and State of Missouri, have invented new and useful Improvements in Seam-Setting Tools, of which the following is a specification, reference being had to the accompanying drawings.

This invention is a seam setting tool for the use of tinners, and the object is to provide a simple, efficient and adjustable tool whereby the seams of sheet metal pipes and tubes may be quickly set.

In the drawings:

Figure 1 is a perspective view showing the tool in use on a seam.

Figure 2 is a frontal elevation of the tool.

Figure 3 is a rear view.

Figure 4 is an end view.

Figure 5 is a bottom view.

The invention consists of a shank 1 with an elongated, rectangular head 2 which has an integral, depending jaw 3 along one side, and guide grooves 4 cut across each end, said grooves being directed inwardly and downwardly as shown. Opposed to the fixed jaw 3 is a movable jaw 5 and set 5' at the lower face of the jaw, the jaw 5 being slidingly mounted to the head 2 by guides 6 extended up from the ends of the jaw 5 and then bent down into the guide grooves 4. An ear 7 is extended up from the jaw 5 at the front thereof and a bolt 8 is permanently set in the head 2, with its threaded end 9 slidingly passed through this ear 7. A thumb screw 10 engages the threaded end 9, said thumb screw having an inner, integral washer 11 disposed against the inner side of the ear 7. Thus the jaw 5 may be adjusted by turning the thumb screw 10. On turning this screw outwardly, the inner integral washer 11 draws the entire jaw and set 5 outwardly.

In use the jaws may be spaced apart as desired to fit over the interlocked seams 12 of the pipe 13, and the interlocked seams are forced together by a blow on the shank 1 after which the seams are firmly set by placing the broad base or set 5' upon the seams and again striking the shank 1.

While I have herein described a certain specific method of constructing and assembling the elements of my invention, it is understood same may be varied in minor details, not departing from the spirit of my invention as defined in the appended claim.

I claim:

A seam setting tool, comprising a head and shank; a fixed jaw depending from one edge of the head; guide grooves cut inwardly and downwardly across the ends of the head; a combined jaw and set slidingly mounted in said guide grooves and moving opposite the fixed jaw; an ear extended up from the movable jaw; and a bolt extended from the head through said ear as means for adjusting the jaws.

HENRY F. G. SCHUSKE.

Witnesses:
GUSTAVE H. SCHUSKE,
JOSEPH R. HOLUB.